(12) United States Patent
Moore

(10) Patent No.: US 11,431,763 B2
(45) Date of Patent: Aug. 30, 2022

(54) PERSONALIZED CONTENT DELIVERY ARCHITECTURE

(71) Applicant: Comcast Cable Communications, LLC, Philadelphia, PA (US)

(72) Inventor: Jonathan Moore, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 801 days.

(21) Appl. No.: 13/630,210

(22) Filed: Sep. 28, 2012

(65) Prior Publication Data
US 2014/0095712 A1   Apr. 3, 2014

(51) Int. Cl.
*G06F 15/173* (2006.01)
*H04L 65/1063* (2022.01)
*H04L 65/612* (2022.01)
*H04L 65/60* (2022.01)

(52) U.S. Cl.
CPC ...... *H04L 65/1063* (2013.01); *H04L 65/4084* (2013.01); *H04L 65/605* (2013.01)

(58) Field of Classification Search
CPC ... H04L 67/1097; H04L 67/288; H04L 9/088; H04L 63/0428; H04L 67/306; G06F 21/6245; G06F 17/30; H04M 15/00
USPC .................................................. 709/225, 227
See application file for complete search history.

(56) References Cited

U.S. PATENT DOCUMENTS

| | | | | |
|---|---|---|---|---|
| 8,041,641 | B1* | 10/2011 | Panchbudhe | G06F 11/1453 707/613 |
| 8,479,228 | B1* | 7/2013 | Simon | G06Q 30/0241 709/219 |
| 8,510,773 | B1* | 8/2013 | Abou-Rizk | G06Q 30/0261 725/32 |
| 8,687,054 | B1* | 4/2014 | Elwell | H04N 21/23439 348/42 |
| 8,694,479 | B1* | 4/2014 | Heyworth et al. | 707/705 |
| 2008/0039208 | A1* | 2/2008 | Abrink et al. | G06F 19/00 707/1 |
| 2008/0178239 | A1* | 7/2008 | Yampanis | H04L 41/5064 725/110 |

(Continued)

OTHER PUBLICATIONS

"The LMAX Architecture", http://martinfowler.com/articles/lmax.html, 14 pages, (printed Sep. 19, 2012).

(Continued)

*Primary Examiner* — Cheikh T Ndiaye
*Assistant Examiner* — Ayele F Woldemariam
(74) *Attorney, Agent, or Firm* — Banner & Witcoff, Ltd.

(57) ABSTRACT

A content network is presented where at least one of non-personalized data commonly applicable to a user base and personalized data is maintained. In an aspect, each element of the personalized data may be applicable to at least one, but less than all, of users within the user base. The non-personalized data may be stored across a plurality of servers included in a group, and the personalized data is stored across at least one, but less than all, of the plurality of computing devices included in the group. An update to data stored may be received and a determination made as to whether the update to data is to the non-personalized data or the personalized data. Then, one of the non-personalized data or the personalized data set stored in the server may be updated.

21 Claims, 8 Drawing Sheets

(56) References Cited

U.S. PATENT DOCUMENTS

| | | | |
|---|---|---|---|
| 2008/0213741 A1* | 9/2008 | Redd et al. .................. | 434/365 |
| 2011/0064388 A1* | 3/2011 | Brown .................. | G06T 13/20 |
| | | | 386/285 |
| 2011/0119058 A1* | 5/2011 | Berard ................ | G11B 27/034 |
| | | | 704/235 |
| 2011/0161172 A1* | 6/2011 | Lee ....................... | G06Q 30/02 |
| | | | 709/224 |
| 2011/0161414 A1* | 6/2011 | Satoda ................ | H04N 7/1675 |
| | | | 709/203 |
| 2012/0070045 A1* | 3/2012 | Vesper et al. ................ | 382/128 |
| 2013/0091243 A1* | 4/2013 | Harnevo ............... | G06Q 30/00 |
| | | | 709/217 |
| 2014/0040212 A1* | 2/2014 | Yochai et al. ............... | 707/687 |

OTHER PUBLICATIONS

M. Thompson, D. Farley, M. Barker, P. Gee, and A. Stewart, "Disruptor: High performance alternative to bounded queues for exchanging data between concurrent threads," v1.0, pp. 1-11.

"All Things Distributed," Werner Vogels' weblog on building scalable and robust distributed systems. http://www.allthingsdistributed.com/2007/10/amazons_dyanamo.html, 22 pages, (printed Sep. 19, 2012).

\* cited by examiner

PERSONALIZED CONTENT DELIVERY ARCHITECTURE

BACKGROUND

Many content storage and distribution sites combine some portion of non-personalized content, such as entertainment metadata, with some portion of user data to provide a personalized media consumption experience. An n-tier architecture consisting of stateless application servers allows for the combination of personalized and non-personalized content for a content site. Known architectures, however, have performance and scalability challenges. For example, backend databases can become bottlenecks and the application servers may spend resources waiting for input/output processing to complete, hence not utilizing their computer processing resources.

Another approach uses a journaling file system and replication to provide durability and recoverability while allowing business logic to run largely free from input/output processing. However, such journaling file system architectures may not be compatible with many types of databases. For content networks with large number of users, aggregate data storage needs may exceed the amount of available memory. A system for more efficiently and more cost-effectively providing content to users is needed.

SUMMARY

Some of the various features described herein relate to a system and method for providing content (e.g., media content, video, data, audio, and/or combinations) that includes personalized and non-personalized content to a user. A cluster of application computing devices, such as servers, is formed and each application device in the cluster may retain a copy of the non-personalized data in-memory. In addition, the application devices may form a consistent hash ring to subdivide the user space between them, with each application server then having in-memory some portion of the user base and, for any particular user, having that data resident on less than all of the application servers.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements.

DETAILED DESCRIPTION

Figure 1:
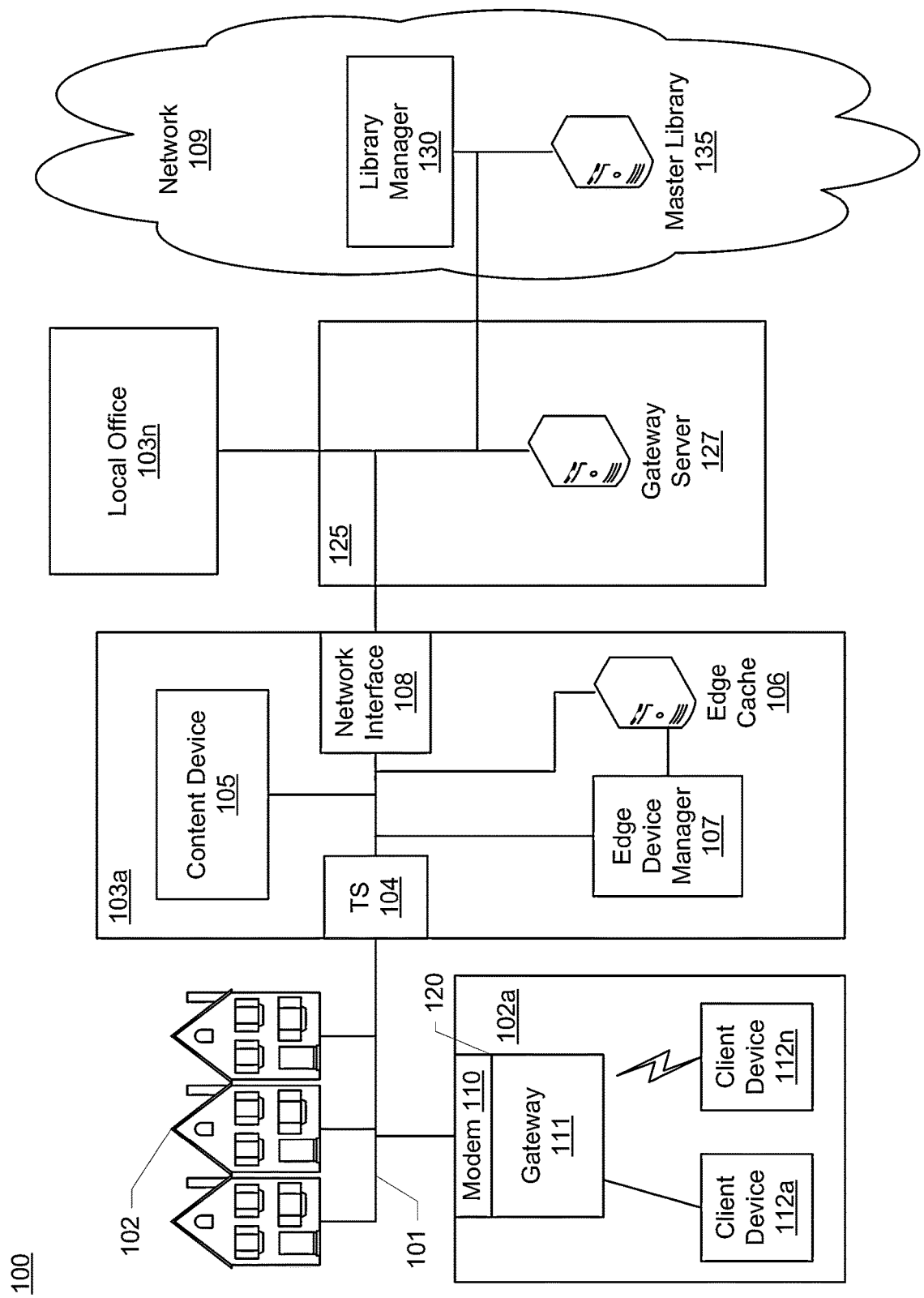
FIG. 1 illustrates an example information access and distribution network.

FIG. 1 illustrates an example information access and distribution network 100 on which many of the various features described herein may be implemented. Network 100 may be any type of information distribution network, such as satellite, telephone, cellular, wireless, etc. One example may be an optical fiber network, a coaxial cable network or a hybrid fiber/coax (HFC) distribution network. Such networks 100 use a series of interconnected communication links 101 (e.g., coaxial cables, optical fibers, wireless connections, etc.) to connect multiple premises, such as homes 102, to a local office (e.g., a central office or headend 103a). The local office 103a may transmit downstream information signals onto the links 101, and each home 102 may have a receiver used to receive and process those signals.

There may be one link 101 originating from the local office 103a, and it may be split a number of times to distribute the signal to various homes 102 in the vicinity (which may be many miles) of the local office 103a. These homes 102 may be in the same service area, such as a service area of the local office 103a. Homes 102 in the same service area may be geographically located within the same region(s). These homes 102 may also be physically and/or directly connected to the same network utilized by the local office 103a to provide content (e.g., an interconnection of links 101).

Although the term home is used by way of example, locations 102 may be any type of user premises, such as businesses, institutions, etc. The links 101 may include components not illustrated, such as splitters, filters, amplifiers, etc. to help convey the signal clearly. Portions of the links 101 may also be implemented with fiber-optic cable, while other portions may be implemented with coaxial cable, other links, or wireless communication paths.

The local office 103a may include an interface 104, which may be a termination system (TS), such as a cable modem termination system (CMTS), which may be a computing device configured to manage communications between devices on the network of links 101 and backend devices such as an edge device manager 107, edge cache 106, and content device 105 (to be discussed further below). The interface may be as specified in a standard, such as, in an example of an HFC-type network, the Data Over Cable Service Interface Specification (DOCSIS) standard, published by Cable Television Laboratories, Inc. (a.k.a. CableLabs), or it may be a similar or modified device instead. The interface may be configured to place data on one or more downstream channels or frequencies to be received by devices, such as modems at the various homes 102, and to receive upstream communications from those modems on one or more upstream frequencies.

The local office 103a may also include one or more network interfaces 108, which can permit the local office 103a to communicate with various other local offices 103n, devices 125, and/or networks 109. The interface 108 may include corresponding circuitry needed to communicate with other local offices, devices, and/or networks. For example, interface 108 may facilitate communications with other devices on networks such as a cellular telephone networks and/or satellite networks.

Networks 109 may include networks of Internet devices, telephone networks, cellular telephone networks, fiber optic networks, local wireless networks (e.g., WiMAX), satellite networks, and any other desired network. The network 109 may include and/or function as a cloud computing infrastructure comprising various processing and/or memory devices (e.g., servers, databases, application providers, etc.). Network 109 may include a library manager 130, which may be a computing device as will be described later in further detail, configured to manage one or more libraries 135 that store content to be provided to users, such as at their homes 102. Libraries 135 may be storage devices, such as hardware and/or software servers, databases, etc. The content stored at the libraries 135 may be, for example, video on demand movies, streaming movies, television programs, songs, text listings, etc. The content stored at and/or provided by the master library 135 may include all content available to users at their homes 102.

The network 109 may communicate with one or more gateways 125, which may be geographically distributed around the country or world. Gateway 125 may have one or more gateway servers 127 (e.g., a storage device) that stores and/or provides content requested by downstream devices, such as devices at home 102a and/or local offices 103a-n. The content servers 127 may store a subset of the content stored at master library 135. Alternatively, some of the content stored at the gateway server 127 might not overlap with the content stored at the master library 135. Gateway 125 may be connected to a plurality of local offices 103a-n by one or more networks and/or communication links. Accordingly, content may be provided directly from gateway server 127 (instead of from, e.g., library 135) to any connected local office if the content is available at the gateway server.

As noted above, the local office 103a may include a variety of devices, such as a content device 105 that can receive requests for, and in response, provide content, such as on-demand content. The local office may also include edge cache 106, and edge device manager 107 that may be configured to perform various functions. For example, content device 105 may receive requests for on demand content from users at homes 102, through interface 104. The content device 105 may process each received request and provide content in response to the requests. The content device 105 may include software to validate user identities and entitlements, locate and retrieve requested data, encrypt the data, and/or initiate delivery (e.g., streaming, downloading) of the content to the requesting user and/or device.

Content device 105 may communicate with edge cache 106 and/or edge device manager 107 to provide the content. For example, the content device 105 may transmit commands to the edge device manager 107 to either provide or not to provide requested content to the users. The edge cache 106 may be one or more computing devices that are configured to store content to be provided to users in the homes. The content stored at edge cache 106 may be a subset of the content stored at gateway server 127. Alternatively, some of the content stored at the edge cache 106 might not overlap with the content stored at gateway server 127. The edge device manager 107 may query one or more databases, such as edge cache 106, gateway server 127, and/or master library 135 for content to be provided to users at their homes 102.

The local office 103a may also include one or more additional computing devices (e.g., servers). For example, local office 103a may include an application server that may be a computing device configured to offer any desired service, and may run various languages and operating systems (e.g., servlets and JSP pages running on Tomcat/ MySQL, OSX, BSD, Ubuntu, Redhat, HTML5, JavaScript, AJAX and COMET). For example, an application server may be responsible for collecting data such as television program listings information and generating a data download for electronic program guide listings.

Another application server may be responsible for monitoring user viewing habits and collecting that information for use in selecting advertisements. Another application server may be responsible for formatting and inserting advertisements in a video stream being transmitted to the homes 102. These application servers may provide services in conjunction with content provided to users.

An example home 102a may include an interface 120. The interface may comprise a device 110, such as a modem, which may include transmitters and receivers used to communicate on the links 101 and with the local office 103a. The device 110 may be, for example, a coaxial cable modem (for coaxial cable links 101), a fiber interface node (for fiber optic links 101), or any other desired modem device. The device 110 may be connected to, or be a part of, a gateway interface device 111.

The gateway interface device 111 may be a computing device that communicates with the device 110 to allow one or more other devices in the home to communicate with the local office 103a and other devices beyond the local office. The gateway 111 may be a set-top box (STB), digital video recorder (DVR), computer server, or any other desired computing device. The gateway 111 may also include (not shown) local network interfaces to provide communication signals to devices 112a-n in the home, such as televisions, additional STBs, personal computers, laptop computers, wireless devices (wireless laptops and netbooks, mobile phones, mobile televisions, personal digital assistants (PDA), etc.), and any other desired devices. These devices (along with gateway 111 and/or modem 110) may be used to request content. Examples of the local network interfaces include Multimedia Over Coax Alliance (MoCA) interfaces, Ethernet interfaces, universal serial bus (USB) interfaces, wireless interfaces (e.g., IEEE 802.11), Bluetooth interfaces, and others.

Figure 2:
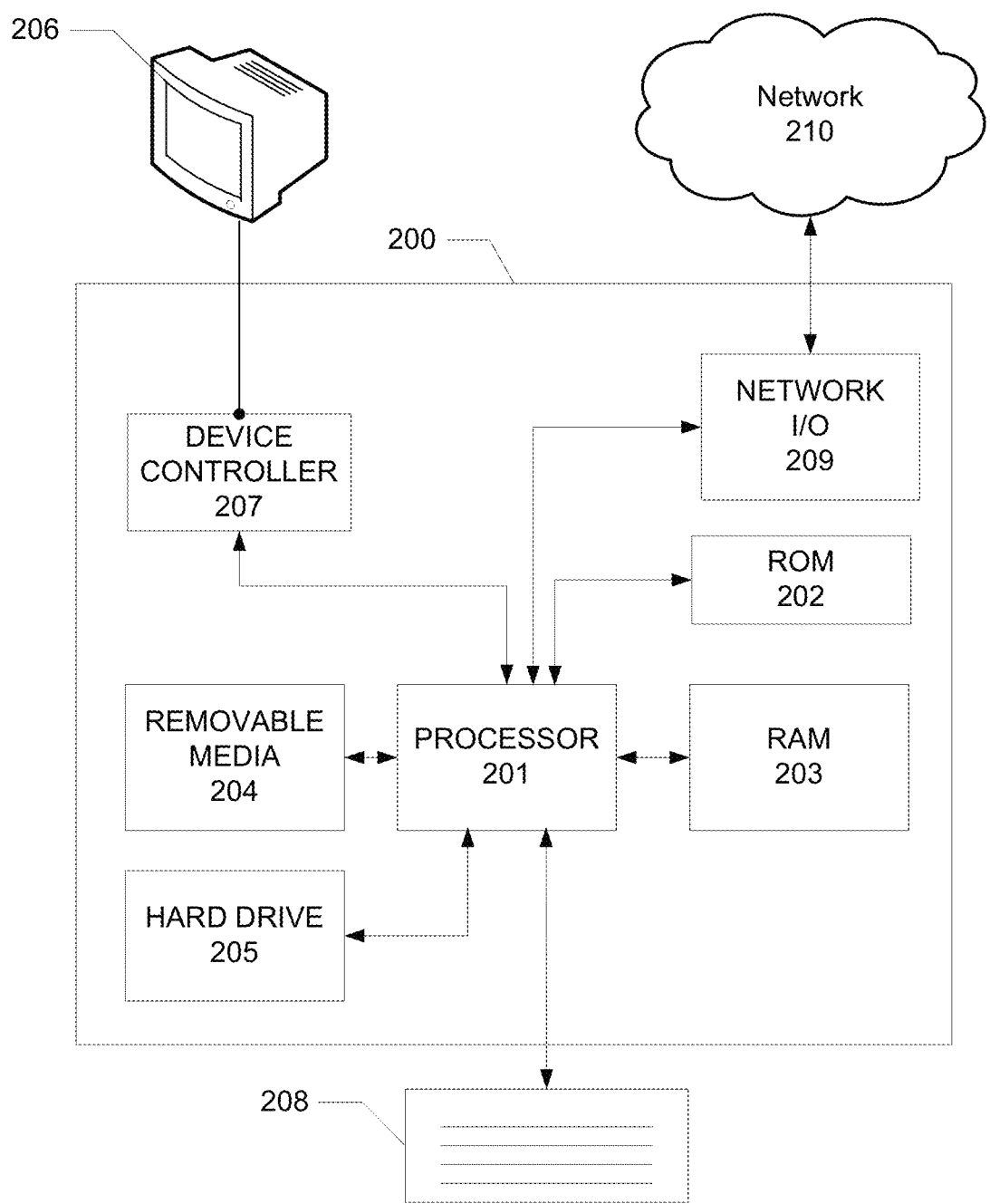
FIG. 2 illustrates an example hardware platform on which the various elements described herein can be implemented.

The various devices described herein may be computing devices, and FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, hard drive 205, removable media 204, such as a Universal Serial Bus (USB) drive, compact disk (CD) or digital versatile disk (DVD), floppy disk drive, or any other desired electronic storage medium.

Instructions may also be stored in an attached (or internal) hard drive 205. The computing device 200 may include one or more output devices, such as a display 206 (or an external television), and may include one or more output device controllers 207, such as a video processor. There may also be one or more user input devices 208, such as a remote control, keyboard, mouse, touch screen, microphone, etc. The computing device 200 may also include one or more network interfaces, such as input/output circuits 209 (such as a network card) to communicate with an external network 210. The network interface may be a wired interface, wireless interface, or a combination of the two. In some embodiments, the interface 209 may include a modem (e.g., a cable modem), and network 210 may include the communication links 101 discussed above, the external network 109, an in-home network, a provider's wireless, coaxial, fiber, or hybrid fiber/coaxial distribution system (e.g., a DOCSIS network), or any other desired network.

Figure 3A:
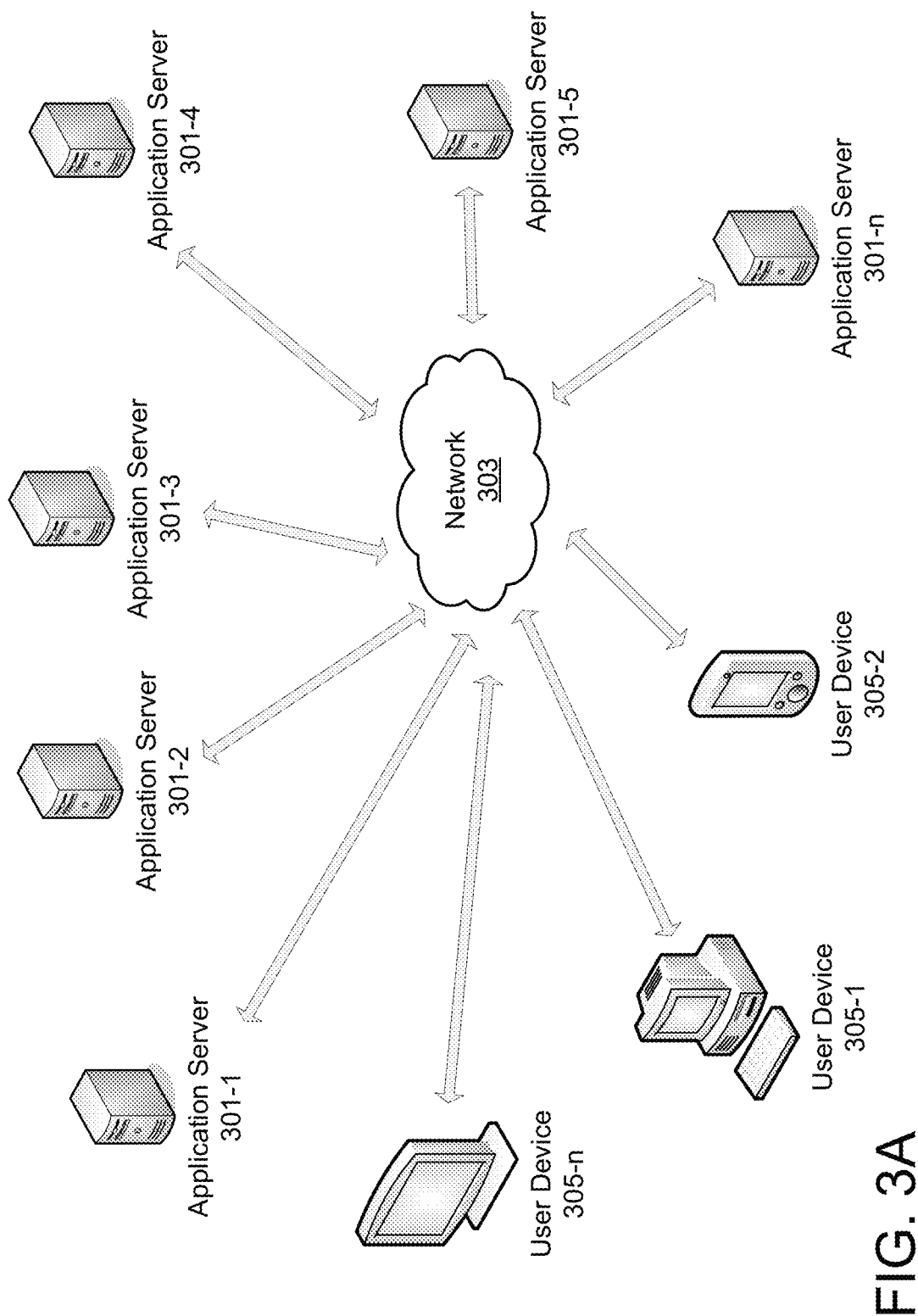
FIGS. 3A-3B illustrate example block diagrams of a system for accessing and distributing content according to one or more illustrative aspects of the disclosure.
Figure 3B:
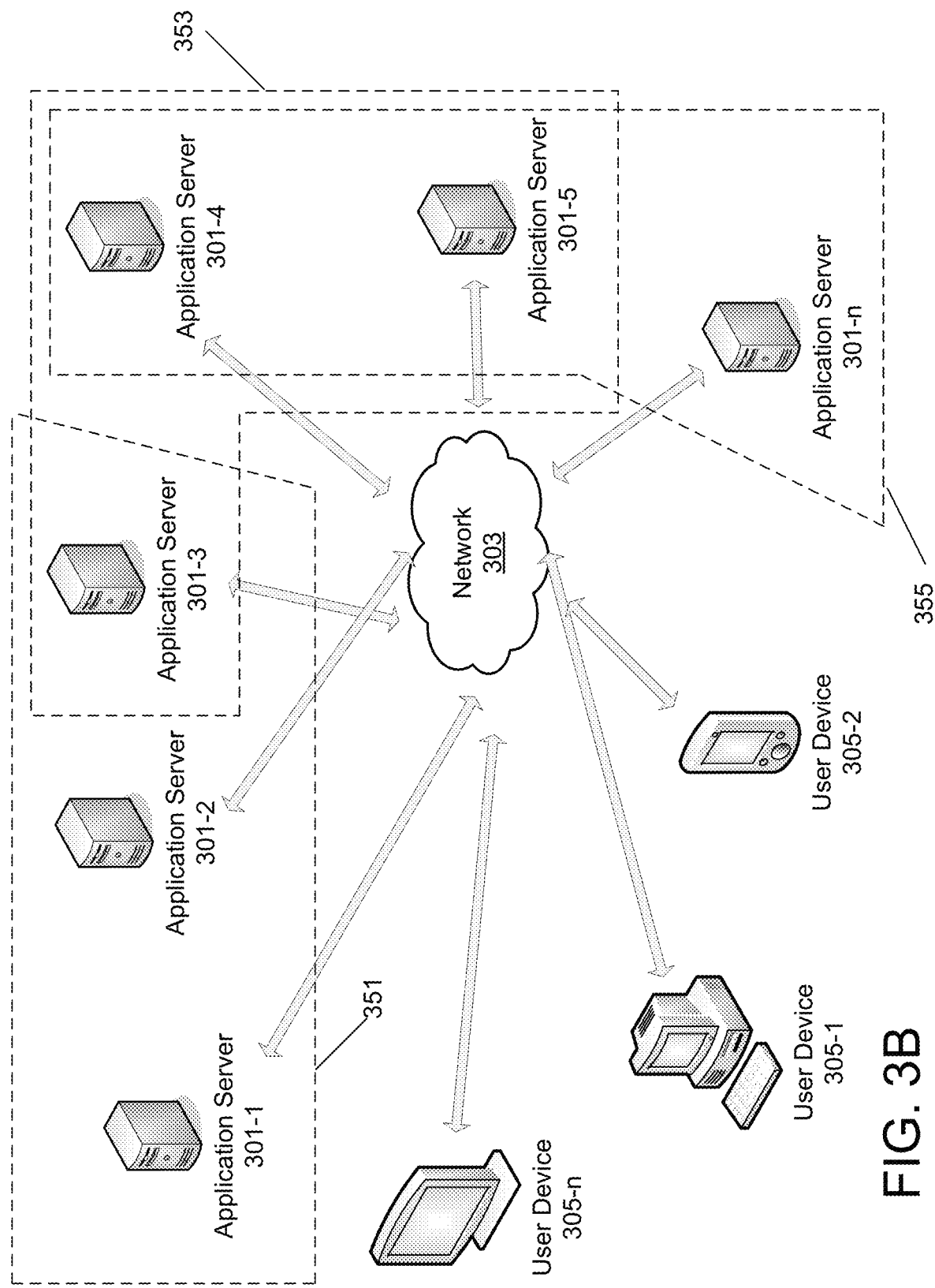

FIGS. 3A-3B illustrate example block diagrams of a system for accessing or distributing content according to one or more illustrative aspects of the disclosure. FIGS. 3A and 3B show a plurality of user devices 305-1, 305-2, and 305-n. Although shown as three user devices in FIGS. 3A and 3B, the designation of user device 305-n is shown to identify any of a number of additional user devices. In accordance with one or more aspects of the present disclosure, a plurality (e.g., thousands or millions) of user devices may be included as part of the overall system for operation purposes.

User devices 305-1, 305-2, and 305-n, which may comprise one or more of any processing, receiving, and/or displaying device, such as one or more televisions, smart phones, set-top boxes (STBs), digital video recorders (DVRs), gateways, etc., can serve as a network interface between a user and a network, such as network 303. User device 305-1 is illustratively shown as a desktop computing device. User device 305-2 is illustratively shown as a handheld computing device, such as a mobile phone/smart phone. User device 305-n is illustratively shown as a television output device. A television output device may include and/or be operatively connected to a gateway, such as gateway 111, a modem, such as modem 110, and/or a set-top box in a user home or other area. Any of a number of additional types of user devices also may be operatively connected to network 303. Network 303 may be any type of communication network, such as satellite, fiber optic, coaxial cable, cellular telephone, wireless (e.g., WiMAX), twisted pair telephone, etc., or any combination thereof (e.g., a hybrid fiber coaxial (HFC) network).

A plurality of computing devices, such as application servers 301-1, 301-2, 301-3, 301-4, 301-5, and 301-n (which may be any type of a computing device) is shown. Application server 301-n is shown to identify any of a number of additional application servers. In accordance with one or more aspects of the present disclosure, hundreds or thousands of servers may be included as part of the overall system for operation purposes. Application servers 301-1, 301-2, 301-3, 301-4, 301-5, and 301-n may comprise one or more of any processing, receiving, and/or transmitting device that may serve as a network interface between content for a user and a network, such as network 303. Each application server may be a datastore that is external to each of the other application servers.

According to one or more aspects of the present disclosure, the plurality of application servers 301-1, 301-2, 301-3, 301-4, 301-5, and 301-n are specifically configured for maintaining non-personalized data for content and personalized data for the content. For example, a user may want to access a web site that include content that has both non-personalized data, e.g., data that is the same for any user that accesses or distributes the content of that web site, and personalized data, i.e., data that is specific to an individual user that accesses or distributes the content of that web site.

Figure 7:
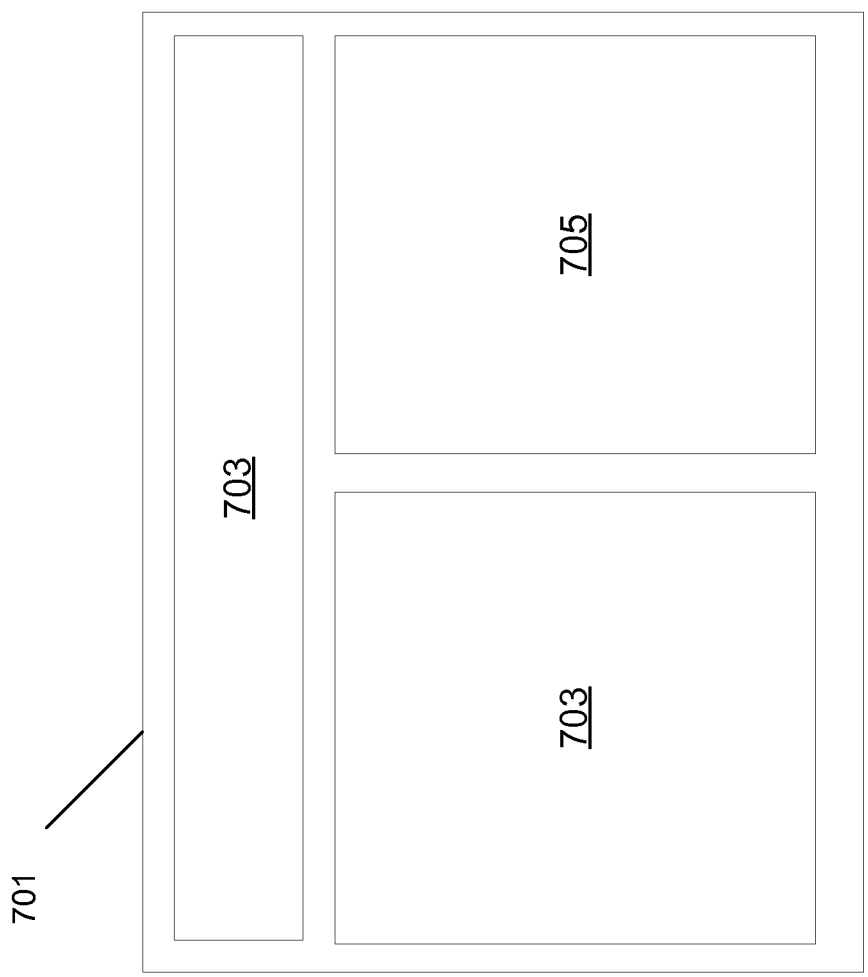
FIG. 7 illustrates an example user interface with content according to one or more illustrative aspects of the disclosure.

FIG. 7 illustrates an example user interface with content according to one or more illustrative aspects of the disclosure. The provided content 701 shown in FIG. 7 is a combination of non-personalized content 703. Such non-personalized content is data that is the same for any user that accesses or distributes the content of that web site. Examples of non-personalized data include a logo for a company, instructions, a color scheme for the content, and/or other data. Non-personalized data includes any such data that does not correlate to the user accessing or distributing the content.

FIG. 7 also illustratively shows personalized content 705 as well. Personalized content is data that is specific to an individual user that accesses or distributes the content of that web site. Examples of personalized content include account information, a user name, and a specific configuration of data in coordination with a profile setting of a user (e.g., sports team scores, local weather, local news, personal stick watch list, etc.). Personalized data includes any such data that correlates to the user accessing or distributing the content.

FIG. 3B illustrates the block diagram of FIG. 3A with particular application servers configured to store user data for particular user devices. As described herein, each application server of a plurality of application servers, such as each of application servers 301-1, 301-2, 301-3, 301-4, 301-5, and 301-n includes all non-personalized data for content of a web site. However, each of the plurality of application servers 301-1, 301-2, 301-3, 301-4, 301-5, and 301-n only includes a portion of personalized data for the content of the web site. However, the personalized data for the content of the web site for a single user is not maintained in each application server, only those specifically designated to maintain such personalized data.

Group 351 of application servers 301-1, 301-2, and 301-3 may be configured to maintain non-personalized data for content and personalized data for content for a specific user. The specific user may access or distribute content with her user device 305-1. Application server 301-1 may be a primary application server that receives and responses to request for content that are received from the specific user.

Application servers 301-2 and 301-3 may be secondary and tertiary application servers for the specific user that are updated with personalized data for the specific user via the primary application server 301-1 and handle and receive requests to access or distribute content from the specific user when the primary application server 301-1 is not operating properly and/or cannot respond for some reason. As such, each specific user is associated with at least one application server that maintains the personalized data of the specific user and may be associated with one or more other application servers, but fewer than all, for replication and redundancy protection.

In the example of FIG. 3B, application servers 301-1, 301-2, and 301-3 in group 351 maintain personalized data for a specific user while the other application servers in the other groups, namely application servers 301-4, 301-5, and 301-n, do not maintain personalized data for the specific user. Similarly, application servers 301-3, 301-4, and 301-5 identified as group 353 may be configured to maintain personalized data for a second specific user. The second specific user may access or distribute content with her user device 305-2. Application server 301-4 may be a primary application server that receives and responses to request for content that are received from the second specific user.

Application servers 301-3 and 301-5 may be secondary and tertiary application servers for the second specific user that are updated with personalized data for the second specific user via the primary application server 301-4 and handle and receive requests to access or distribute content from the second specific user when the primary application server 301-4 is not operating properly and/or cannot respond for some reason. As such, application servers 301-3, 301-4, and 301-5 in group 353 maintain personalized data for a second specific user while the other application servers in the other groups, namely application servers 301-1, 301-2, and 301-n, do not maintain personalized data for the second specific user.

Application servers 301-4, 301-5, and 301-n identified as group 355 may be configured to maintain personalized data for a third specific user. The third specific user may access or distribute content with her user device 305-n. Application server 301-5 may be a primary application server that receives and responses to request for content that are received from the third specific user.

Application servers 301-4 and 301-n may be secondary and tertiary application servers for the third specific user that are updated with personalized data for the third specific user via the primary application server 301-5 and handle and receive requests to access or distribute content from the third specific user when the primary application server 301-5 is not operating properly and/or cannot respond for some reason. As such, application servers 301-4, 301-5, and 301-n in group 355 maintain personalized data for a third specific user while the other application servers in the other groups, namely application servers 301-1, 301-2, and 301-3, do not maintain personalized data for the third specific user.

Figure 4:
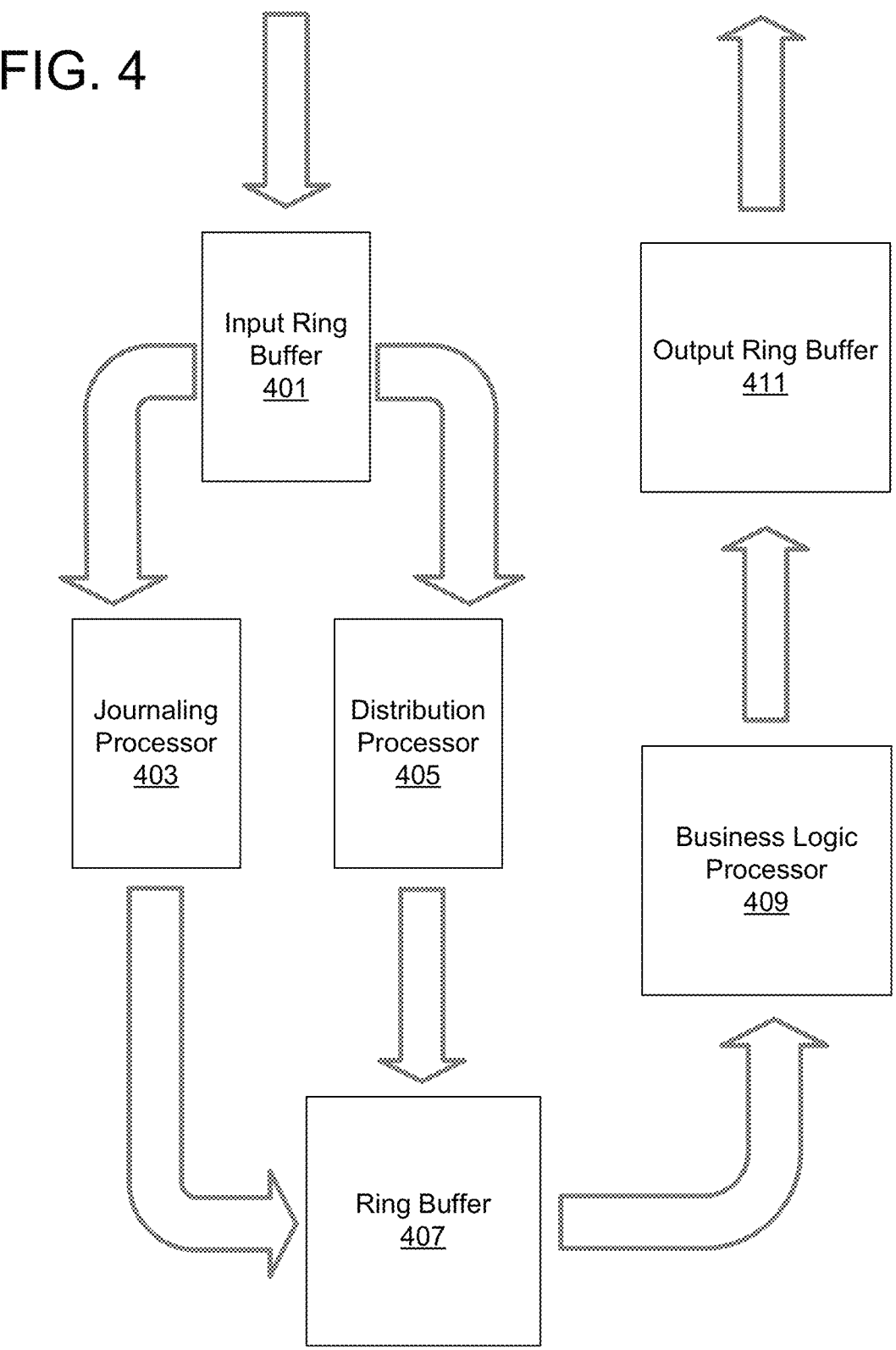
FIG. 4 illustrates an example block diagram of an application computing device according to one or more illustrative aspects of the disclosure.

FIG. 4 illustrates an example block diagram of an application server according to one or more illustrative aspects of the disclosure. The application server in FIG. 4 may be one or more of the application servers 301-1, 301-2, 301-3, 301-4, 301-5, and 301-n in FIGS. 3A and 3B. The application server in FIG. 4 may include an architecture that has an input ring buffer 401, a journaling processor 403, a business logic processor 409, and an output ring buffer 411. Input ring buffer 401, ring buffer 407, and output ring buffer 411 may be a non-blocking concurrent data structure. One such data structure is a disruptor.

A disruptor may be a buffer to pass data from one context, one thread, to another. Within an application server, one thread is responsible for reading incoming requests into the input ring buffer 401. Input ring buffer 401 feeds both a journaling processor 403 and a distribution processor 405. One thread is responsible for journaling those to the appropriate transaction log via the journaling processor 403. Journaling is the process for taking each input message and storing it. One thread is responsible for replicating an update to other applications servers in a group via the distribution processor 405. As an input message is received that is an update, this thread is responsible for ensuring that other application servers included in the group are accordingly distributed the updated data. Journaling processor 403 and distribution processor 405 both in turn feed a ring buffer 407 oriented in front of a business logic processor 409. One thread performs the business logic via the business logic processor 409, updates the in-memory model, and generates output events on the output ring buffer 411. Another thread writes the output messages back out over a network, such as network 303. Each of these threads can operate on a central processing unit core without context switching, while still leaving several threads open for operating system operations.

Figure 5:
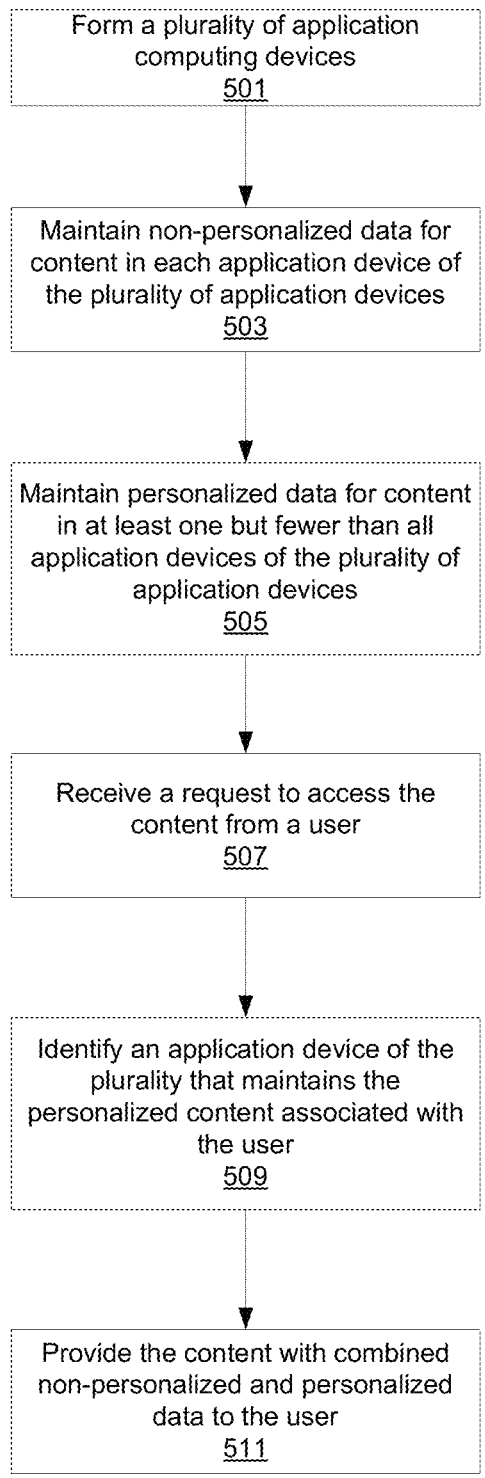
FIG. 5 illustrates an example method of accessing or distributing content according to one or more illustrative aspects of the disclosure.

FIG. 5 illustrates an example method of accessing or distributing content according to one or more illustrative aspects of the disclosure. The steps illustrated in FIG. 5 may be performed by a computing device, such as an application server. For illustrative purposes, the steps will be described as being performed by or with respect to application servers 301-1, 301-2, 301-3, 301-4, 301-5, and/or 301-n.

In step 501, a plurality of application servers are formed. Once formed, in step 503 each application server of the plurality of application servers are configured to maintain non-personalized data for content, such as content associated with a web site. Because the non-personalized data is the same for any specific user seeking to access or distribute the content, each application server is configured to maintain it. However, because the personalized data is not the same for any specific user seeking to access or distribute the content, every application server in the plurality from step 501 are not configured to maintain personalized data for the content for each and every specific user.

As an alternative, in step 505, at least one, but less than all of the application servers in the plurality is configured to maintain personalized data for the content. As such, the personalized data commonly applicable to a user base is spread across multiple application servers but no personalized data for a specific user is maintained in every application server in the plurality.

Proceeding to step 507, a request to access or distribute content may be received from a user device. For example, user device 305-1 may be the user device sending the request that is received in step 507. In step 509, the application server that maintains personalized content for the user sending the request through user device 305-1 is identified. In the example of FIGS. 3A and 3B, this may be application server 301-1.

In accordance with at least one aspect of the present disclosure, the identified application server in step 509 may be a primary application server associated with the requesting user. Moving to step 511, the requested content with combined non-personalized data and personalized data is provided to the requesting user. Such a step may be application server 301-1 providing the combined content to the requesting user's user device 305-1.

Figure 6:
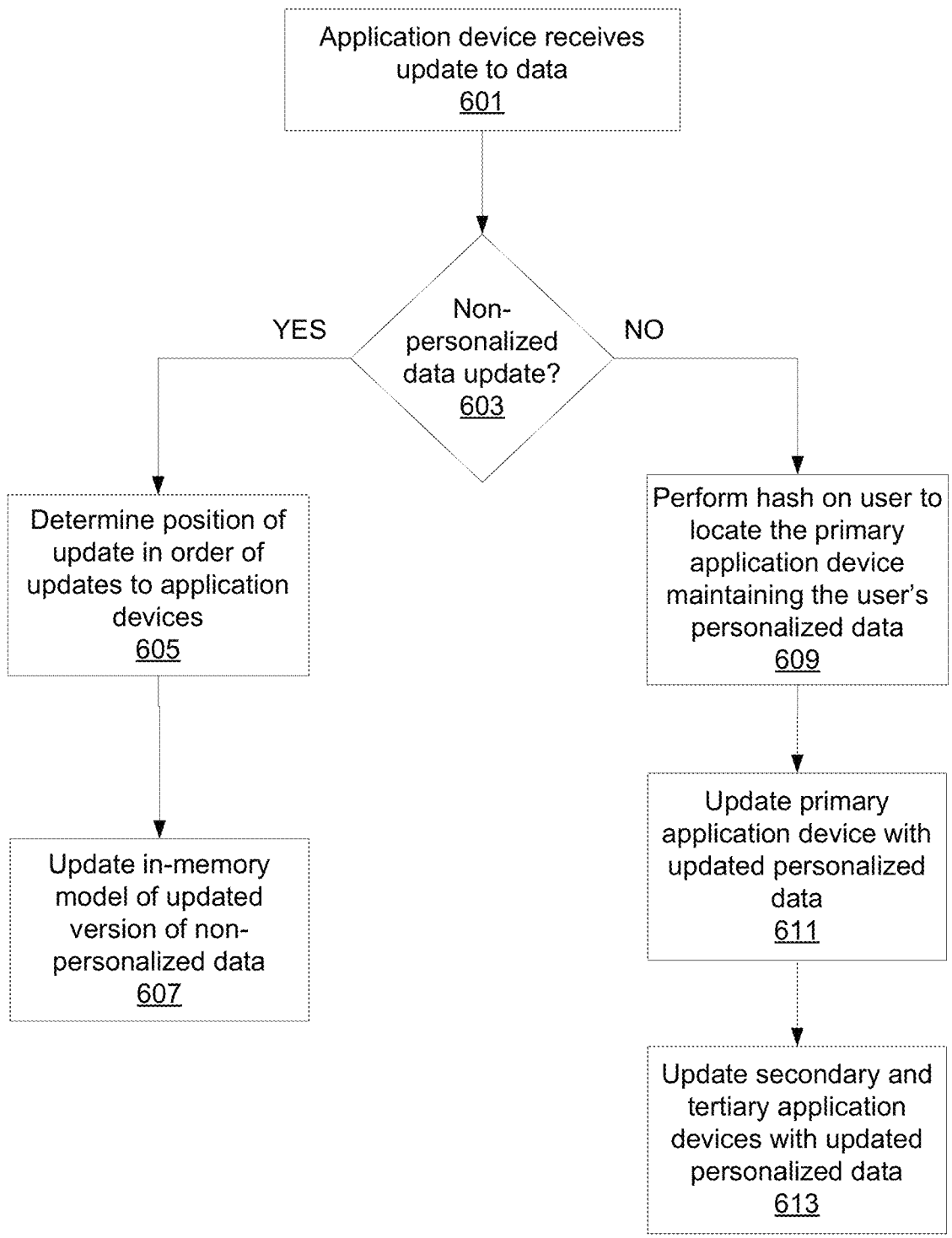
FIG. 6 illustrates an example method for updating content data according to one or more illustrative aspects of the disclosure.

FIG. 6 illustrates an example method for updating content data according to one or more illustrative aspects of the disclosure. The steps illustrated in FIG. 6 may be performed by a computing device, such as an application server. For illustrative purposes, the steps will be described as being performed by or with respect to application servers 301-1, 301-2, 301-3, 301-4, 301-5, and/or 301-n.

In step 601, an application server receives an update to data maintained at the application server. An application server operating the steps of FIG. 6 distinguish two types of updates: updates to non-personalized data, and updates to personalized data. Proceeding to step 603, a determination is made as to whether the update is to non-personalized data. If the update is to non-personalized data, the process moves to step 605. If the update is to personalized data, the process proceeds to step 609.

In step 605, the update is known to be an update of the non-personalized data of the content and the position of the update in order of updates to application servers is determined. For non-personalized data updates, a plurality of application servers may participate in a distributed transaction protocol, such as Paxos, to provide a common view of the order in which the updates should be applied. In addition, the in-memory model may be updated. Proceeding to step 607, updating the in-memory model allows several versions of the non-personalized data to be maintained in memory without having to duplicate shared data. Thus, a user transaction can be applied with the right non-personalized data version, even while non-personalized data updates are occurring and different application server views of the latest version differ.

If the update is to personalized data, the process proceeds to step 609. For personalized data updates, a hash is performed on user to locate the primary application server maintaining the user's personalized data. The primary application server may be the first application server that a user is directed to for receiving content with combined non-personalized and personalized data. In step 611, the primary application server is updated with the updated personalized data. Proceeding to step 613, the primary application server then coordinates updating one or more additional application servers, such as a secondary and a tertiary application server with the updated personalized data.

A mini-Paxos update may be performed between the primary application server and the secondary and tertiary application servers along a consistent hashing ring to update the personalized data across all three application servers. If journalized transaction logs are maintained separately for each hash ring partition, then the ability exists to permit other application servers to quickly hand partitions off to one another during failures or application server addition/subtraction by exchanging checkpoint files and/or transaction sequences.

The various features described above are merely non-limiting examples, and can be rearranged, combined, subdivided, omitted, and/or altered in any desired manner. For example, features of the computing device described herein (which may be one the devices illustrated in FIG. 1) can be subdivided among multiple processors and computing devices. The true scope of this patent should only be defined by the claims that follow.

What is claimed:

1. A method comprising:
   receiving, via a network and from a user device of a first user, a request to access a video streaming content item;
   determining an application server in a first group of application servers, wherein the application servers in the first group each comprises memory storing: non-personalized metadata associated with the video streaming content item, and personalized data specific to the first user;
   performing, by the application server, an update comprising:
     a first update, of the non-personalized metadata stored in the memory of the application server, based on a first in-memory update process; and
     a second update, of the personalized data specific to the first user and stored in the memory of the application server, based on a second in-memory update process different from the first in-memory update process;
   processing, by the application server, the video streaming content item, the non-personalized metadata stored in the memory of the application server, and the personalized data specific to the first user and stored in the memory of the application server, in order to create a first personalized video streaming content item customized for the first user; and
   outputting, via the network and to the user device of the first user, the first personalized video streaming content item.

2. The method of claim 1, wherein the processing the video streaming content item, the non-personalized metadata stored in the memory of the application server, and the personalized data specific to the first user and stored in the memory of the application server comprises:
   combining the video streaming content item, the non-personalized metadata stored in the memory of the application server, and the personalized data specific to the first user and stored in the memory of the application server during the performing the update.

3. The method of claim 1, wherein the performing the update comprises:
   accessing, by one or more processors of the application server, the memory of the application server.

4. The method of claim 1, wherein the performing the update comprises:
   determining that the first update is to the non-personalized metadata;
   accessing, by one or more processors of the application server, the memory of the application server to write an updated version of the non-personalized metadata stored in the memory of the application server; and
   concurrently maintaining, in the memory of the application server, the non-personalized metadata and the updated version of the non-personalized metadata while processing a user transaction associated with the non-personalized metadata stored in the memory of the application server.

5. The method of claim 1, wherein the performing the update comprises:
   determining that the second update is to the personalized data specific to the first user;
   accessing, by one or more processors of the application server, the memory of the application server to update the personalized data specific to the first user and stored in the memory of the application server; and
   coordinating, based on determining that the second update is to the personalized data specific to the first user, with the application servers, other than the application server, in the first group of application servers to update the personalized data across the first group of application servers.

6. The method of claim 1, further comprising, based on determining that the second update is to the personalized data specific to the first user, performing a hash function to locate the application servers, other than the application server, in the first group of application servers.

7. The method of claim 1, wherein the performing the second update comprises updating, along a consistent hashing ring, the personalized data specific to the first user in all application servers in the first group of application servers.

8. The method of claim 1, wherein the memory of each application server in the first group comprises one or more types of random access memory accessible by one or more processors in the same application server.

9. The method of claim 1, wherein the first group of application servers is a subset of, and is less than all of, a cluster of application servers,
   wherein the cluster of application servers each has stored in memory the non-personalized metadata associated with the video streaming content item, and
   wherein a second group of application servers, which is a subset of, and is less than all of, the cluster of application servers, each has further stored in memory: personalized data specific to a second user different from the first user.

10. The method of claim 1, further comprising:
    determining that a primary application server in the first group is not operating properly or is non-responsive for a threshold time; and
    determining the application server, instead of the primary application server, to process the video streaming content item, the non-personalized metadata, and the personalized data specific to the first user.

11. A method comprising:
  receiving, by an application server and via a network, a request from a first user to access a video streaming content item, wherein the application server has stored in memory: non-personalized metadata associated with the video streaming content item, personalized data specific to the first user, and the video streaming content item;
  processing, by the application server, the video streaming content item, the non-personalized metadata, and the personalized data specific to the first user, in order to create a first personalized video streaming content item customized for the first user;
  performing, by the application server, an update comprising:
    a first update, of the non-personalized metadata stored in the memory of the application server, based on a first in-memory update process; and
    a second update, of the personalized data stored in the memory of the application server, based on a second in-memory update process different from the first in-memory update process;
  processing, by a first single thread in the application server, a distribution process for replicating an update to application servers, other than the application server, in a first group of application servers, wherein each of the application servers in the first group of application servers includes memory storing the personalized data specific to the first user;
  processing, by a second single thread in the application server, a journaling process for storing each incoming request; and
  outputting, via the network and to a user device of the first user, the first personalized video streaming content item, wherein the first and second single threads operate without context switching on the application server while still leaving threads for other processing.

12. The method of claim 11, wherein the memory of the application server comprises one or more types of random access memory accessible by one or more processors of the application server.

13. The method of claim 11, further comprising updating, based on a consistent hashing, the personalized data across the first group of application servers.

14. The method of claim 11, wherein the non-personalized metadata is uncorrelated to any user account, and comprises program listings information associated with the video streaming content item.

15. The method of claim 11, wherein the personalized data specific to the first user comprises content viewing habit information of the first user.

16. The method of claim 11, wherein the personalized data specific to the first user comprises a specific configuration of data associated with the first user to provide the first personalized video streaming content customized for the first user.

17. A method comprising:
  updating, in memory of each computing device in a cluster of computing devices and based on a first in-memory update process, non-personalized metadata associated with a content item, wherein the non-personalized metadata is uncorrelated to any user account;
  updating, in memory of each computing device in a first group of computing devices and based on a second in-memory update process, first personalized data associated with the content item, wherein the first personalized data comprises first configuration data to configure a user-specific presentation of the content item for a first user, wherein the second in-memory update process is different from the first in-memory update process, and wherein the first group of computing devices is a subset of, and is less than all of, the cluster of computing devices;
  updating, in memory of each computing device in a second group of computing devices and based on a third in-memory update process, second personalized data associated with the content item, wherein the second personalized data comprises second configuration data to configure a user-specific presentation of the content item for a second user, the second configuration data being different from the first configuration data, and wherein the second group of computing devices is a subset of, and is less than all of, the cluster of computing devices;
  receiving, from a user device accessed by the first user, a request to access the content item;
  determining, from the first group of computing devices and based on determining that the user device is accessed by the first user, a first computing device that has stored, in memory, the non-personalized metadata and the first personalized data associated with the content item;
  processing, by the first computing device and based on the request, the content item, the first personalized data stored in the memory of the first computing device, and the non-personalized metadata stored in the memory of the first computing device, to create a first personalized content item customized for the first user; and
  sending, to the user device accessed by the first user, the first personalized content item comprising the user-specific presentation of the content item for the first user.

18. The method of claim 17, wherein updating the first personalized data comprises:
  receiving an update to the first personalized data in the memory of the first computing device;
  updating, based on the received update, the first personalized data in the memory of the first computing device; and
  coordinating, based on a determination that the update is to the first personalized data, with one or more second computing devices in the first group of computing devices to update the first personalized data across the first group of computing devices,
  wherein the second in-memory update process is a hash-based update process.

19. The method of claim 18, further comprising:
  configuring, based on a profile setting of the first user, the user-specific presentation of the content item for the first user.

20. The method of claim 18, further comprising:
  dividing, based on a file size of a personalized data set to be maintained in the cluster of computing devices and based on sizes of pieces of memory in the cluster of computing devices, the personalized data set into a plurality of personalized data, wherein the plurality of personalized data comprises the first personalized data and the second personalized data.

21. The method of claim 18, wherein the memory of the first computing device is accessible by one or more processors of the first computing device and comprises one or more types of random access memory (RAM).

* * * * *